United States Patent [19]
Winge

[11] 3,724,611
[45] Apr. 3, 1973

[54] BRAKE SHOE CENTERING MECHANISM

[75] Inventor: John L. Winge, South Bend, Ind.

[73] Assignee: The Bendix Corporation, South Bend, Ind.

[22] Filed: June 16, 1971

[21] Appl. No.: 153,717

[52] U.S. Cl. ............. 188/216, 188/79.5 P, 188/331
[51] Int. Cl. ............................................. F16d 65/16
[58] Field of Search ...... 188/79.5 P, 196 M, 216, 331

[56] References Cited
UNITED STATES PATENTS

| | | | |
|---|---|---|---|
| 2,084,972 | 6/1937 | Irving | 188/79.5 P |
| 2,152,041 | 3/1939 | Goepfrich | 188/79.5 P |
| 2,168,700 | 8/1939 | Burnett | 188/331 |
| 3,189,131 | 6/1965 | Price | 188/79.5 P X |

Primary Examiner—Duane A. Reger
Attorney—William N. Antonis et al.

[57] ABSTRACT

A brake in which friction between a rotating drum and a primary brake shoe produces a force which acts on a secondary brake shoe to move the latter shoe into engagement with the drum to thereby decelerate the drum. A shoe retracting device is mounted on the brake backing plate for operative engagement with a strut which interconnects a pair of adjacent ends of the primary and secondary shoes so that the secondary shoe is withdrawn from engagement with the drum upon brake release.

6 Claims, 5 Drawing Figures

PATENTED APR 3 1973 3,724,611
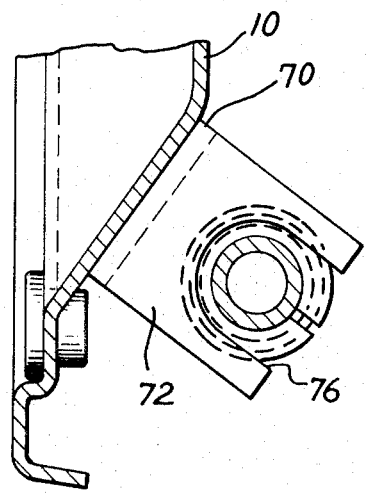
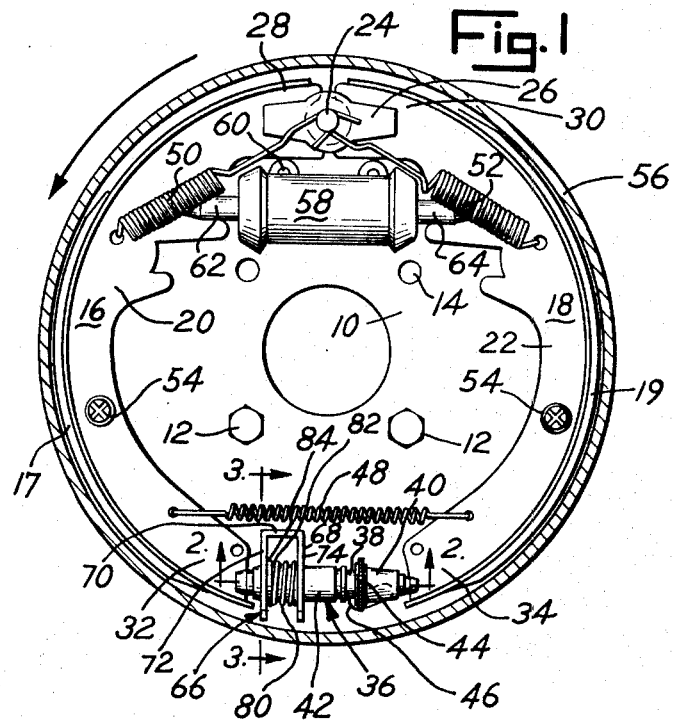
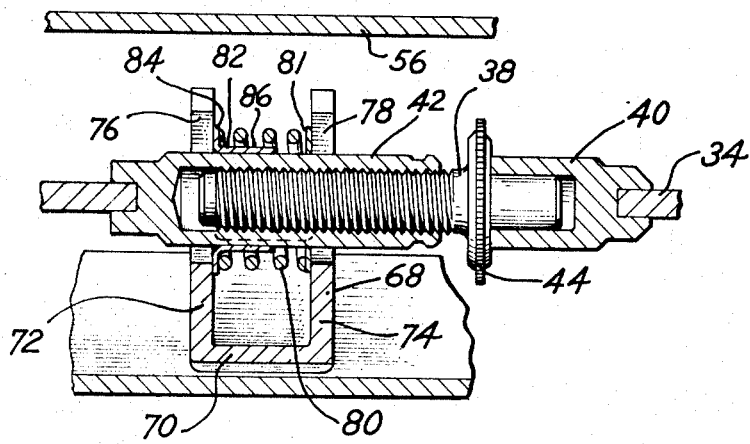
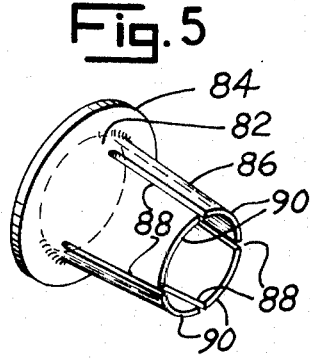
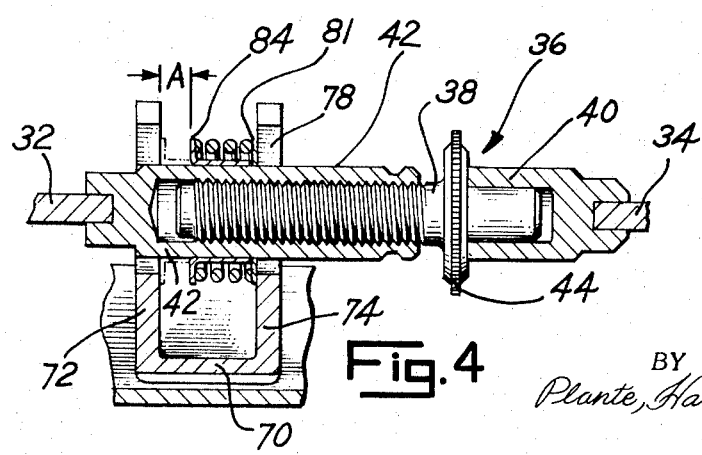
INVENTOR.
JOHN L. WINGE
BY
Plante, Hartz, Smith & Thompson
ATTORNEYS

BRAKE SHOE CENTERING MECHANISM

BACKGROUND OF THE INVENTION

The brake mechanism herein disclosed relates specifically to automotive drum brakes which have been competitively challenged by disc brakes in recent years.

In order to meet this challenge, various improvements to drum brake effectiveness have been offered, such for example, as changing lining composition to provide better drum retardation and longer lining life. Such innovations, while accomplishing their intended goal, sometimes create other problems which must be resolved to make the improvement practical. The use of improved lining composition, for example, intensifies a condition known in the brake art as "secondary brake shoe drag". This condition is particularly troublesome with a certain type of drum brake which when applied urges the primary shoe off its anchor member into engagement with the brake drum imparting its rotational action thereto and to one end of the secondary shoe, through the interconnecting strut, forcing the other end of said secondary shoe against the anchor member. When the brake is released, a spring pulls the primary shoe end into contact with the anchor member, thus removing the primary shoe from frictional contact with the drum. As to the secondary shoe, it is already against the anchor member and because of its tendency, due to self-energization, to remain in contact with the drum after brake release, coupled with the fact that there is frictional resistance between the secondary shoe and backing plate opposing movement of the secondary shoe, there is no guarantee that the secondary shoe will be retracted from the drum. Various ways of combating secondary shoe drag have been proposed, such as shown in U.S. Pat. Nos. 3,175,644 and 3,189,131, assigned to the common assignee for this invention. The prior art approach to the problem, as analyzed by this applicant, has been too complicated, hence too expensive, and/or inadequate from the standpoint of not doing the job effectively. The present invention is believed to solve many of the problems heretofore preventing the adoption of such a device for general use.

SUMMARY OF THE INVENTION

The principal object of the invention is to provide a brake shoe retracting device which maintains a constant force irrespective of shoe wear.

Another object of the invention is to provide a device capable of effectively centering the shoes after each brake release regardless of the amount of the adjustment.

A further object of the invention is to provide a brake shoe retracting device comprising preloaded spring means operatively interconnected between the brake shoe strut and the brake backing plate for withdrawing the secondary shoe from the drum after brake release.

The above and other important objects and features of the invention will be apparent from the following description of the device taken in connection with the accompanying drawings which form a part of this specification.

DESCRIPTION OF THE DRAWINGS

FIG. 1 is a vertical section of the brake taken just inside the drum head, and embodying the principles of my invention;

FIG. 2 is a partial section taken on the line 2—2 of FIG. 1;

FIG. 3 is a section through the lower end of the brake taken on the line 3—3 of FIG. 1;

FIG. 4 is a section corresponding to FIG. 2, illustrating the action of the retracting device;

FIG. 5 is a perspective view of the collet which forms a part of the invention.

DETAIL DESCRIPTION

Referring now to FIG. 1, the brake with which the device of my invention is associated comprises a backing plate 10 secured to an appropriate portion of the vehicle, such as an axle flange, not shown, by bolts 12, passing through holes 14 of the backing plate 10. Brake shoes 16 and 18 are slidably mounted on the backing plate 10 so that webs 20 and 22, respectively, of the shoes are in pivotal engagement at their upper adjacent ends with anchor member 24 attached to the backing plate 10. Linings 17 and 19 are suitably attached to the shoes 16 and 18, respectively. A shoe web guide element 26 is fastened to the anchor member 24 to slidably receive a pair of upper adjacent ends 28 and 30 of the shoes 16 and 18, thereby locating the shoe ends in a fixed lateral position with respect to the backing plate. The shoes 16 and 18 are interconnected at their lower adjacent ends 32 and 34, respectively, by a strut 36. The strut 36, which is of the adjustable type, comprises an adjusting screw 38, a socket member 40, non-rotatably engaging the shoe end 34, and a nut member 42 non-rotatably engaging the shoe end 32. The adjusting screw 38, which threadedly engages the nut member 42 and freely rotates within the socket member 40, is provided with a ratchet wheel 44 to be engaged by a tool inserted through opening 46 in the backing plate 10 when a brake shoe adjustment is desired. The adjustable strut 36 is of conventional construction and well known to persons skilled in the art. Means such as a spring 48 draws the pair of adjacent shoe ends 32 and 34 into engagement with the strut parts 42 and 40, respectively, thereby retaining the strut parts in assembled relationship. In released position, the upper adjacent shoe ends are held against the anchor member 24 by springs 50 and 52 connected, respectively, at one end to the shoe ends 28 and 30 and to the anchor member 24 at their opposite ends. The shoes 16 and 18 are yieldingly retained in sliding relationship to the backing plate 10 by hold-down springs 54. The adjacent shoe ends 28 and 30 are spread apart from the anchor member 24 into engagement with a rotatable drum 56, secured to a vehicle wheel, not shown, by a fluid motor 58, mounted to the backing plate in any suitable manner, such as by studs 60. The fluid motor includes two oppositely acting pistons, not shown, connected to the pair of adjacent shoe ends 28 and 30 by force transmitting pins 62 and 64, respectively. The actuation and operation of the fluid motor are well known to those skilled in the art and need not be further emphasized.

The shoe positioning means 66 to which this invention relates comprises a bracket 68 of U-shaped construction suitably secured to the backing plate 10, as by welding transverse section 70 thereto. Parallel spaced sides 72 and 74, integrally related to the transverse section 70, extend generally at right angles to the backing plate 10 and forwardly thereof, as best shown in FIG. 3. The forward ends of the sides 72 and 74 are formed with opposed slots or notches 76 and 78 through which the strut 36 slides during brake application and release, as the fluid motor 58 is pressurized and depressurized, in a manner well known to those persons skilled in the art. The shoes 16 and 18 are biased to a released position by a preloaded coil spring 80 interposed between the spaced parallel sides 72 and 74 of the bracket 68. The convolutions of the coil spring 80 circumscribe the nut member 42 of the strut 36. A washer 81 is positioned between one end of the spring 80 and the side 74. A collet 82 is located coaxially of the nut member 42 and is equipped with an integral flange 84 engageable by the other end of the coil spring 80 which urges the flange 84 against the side 72. The collet 82 is further provided with an axial extending skirt 86 having longitudinal slots 88, dividing the skirt into fingers or sections 90. The design of the skirt 86 with respect to its frictional engagement of the nut member 42 is such that a sliding frictional fit is obtained on the nut which will sustain the load of the coil spring 80 during forward braking, direction of arrow FIG. 1, but will slide during reverse braking if there is clearance between the drum and the shoe 16. That is, the frictional force between the skirt 86 and the nut 42 is set at a predetermined value which is greater than the biasing force of the preloaded coil spring 80, so that the collet 82 and nut 42 will move as a unit in establishing the shoes in their proper relationship to the drum during forward braking, assuming the lining 19 is properly adjusted to the drum. However, on reverse braking at a time when there is clearance between the lining 17 and the drum, any braking force acting on the shoe 16 through said strut in excess of said predetermined value will cause relative movement between the strut and collet. This will slide the strut to the left in the collet, thus causing the nut 42 to assume a new position in the collet.

MODE OF OPERATION

For forward movement of the vehicle, assume drum rotation is in the direction of the arrow of FIG. 1. Pressurization of the fluid motor 58 with drum rotation as shown forces the end 28 of the shoe 16 away from the anchor 24 causing the lining 17 to frictionally contact the drum 56. This frictional contact between lining and drum tends to rotate the shoe 16, which is the primary shoe in forward braking, in a counterclockwise direction. Concurrently, with counterclockwise movement of the shoe 16 as aforesaid, the shoe 18, which is the secondary shoe in forward braking, through contact of the lining 19 with the drum 56, also tends to be rotated counterclockwise, thus driving the end 30 of the shoe 18 against the anchor member 24. This action of the rotating drum on the shoe 18 urging it against the anchor 24 is enhanced or intensified by the rotational movement of the shoe 16, drivably connected to the shoe 18 through the strut 36. Releasing the pressure from the wheel cylinder 58 permits the spring 50 to draw the end 28 of the shoe 16 against the anchor member 24 while at the same time withdrawing the lining 17 from contact with the inner drum surface through pivotation of the shoe end 32 on the end of the nut 42. Now, as to the shoe 18, which as aforementioned is the secondary shoe in forward braking, it will be remembered that this shoe is already in abutment with the anchor member 24 and due to its self-energization, it has a tendency to remain in contact with the drum and would probably remain in contact until knocked loose, if it were not for applicant's retracting device 66 which effectively withdraws the secondary shoe from the drum upon brake release.

It will be recalled that pressurization of the fluid motor 58 caused the shoes to engage the rotating drum, thus tending to rotate both shoes counterclockwise. This rotational action moved the strut 36 and collet 82 to the right an amount A, determined by the distance between the brake lining 19 and the drum, at the same time, compressing the spring 80, as best shown in FIG. 4. Releasing the pressure from the wheel cylinder 58 permits the spring 50 to return the shoe end 28 to the anchor 24 and also enables the preloaded spring 80 to return the strut 36 to the position of FIG. 1, at the same time disengaging the lining 19 of the shoe 18 from the drum. This action of the spring 80 in disengaging the secondary shoe 18 from the drum is through the spring 48 which ties the adjacent ends 32 and 34 of the respective shoes to the adjustable strut. This provides for a positive withdrawal of the secondary shoe 18 after each forward brake application, thus increasing lining life.

As the linings 17 and 19 wear, adjustment may be made by inserting a tool through the opening 46 and rotating the ratchet wheel 44. Upon the initial forward and reverse brake applications after making the adjustment, the shoes will acquire their respective positions in relationship to the drum. On reverse braking, the strut 36 and more particularly the nut 42 will move to the left if there is clearance between the shoe 16 and the drum, thus sliding the nut in the collet since the flange 84 is now abutting the side 72. This, of course, means that as the lining 17 wears and adjustments are made, the nut 42 slides through the collet to the left taking on new positions in the collet. Although the strut is shown for manual adjustment, applicant's device functions equally well with automatic adjustment.

While there have been described above the principles of this invention in connection with a specific device, it is to be understood that this description is made only by way of example and not as a limitation to the scope of the invention.

I claim:
1. A drum brake which comprises:
   a backing plate;
   a pair of brake shoes slidably mounted on said backing plate, said shoes arranged on said backing plate to have two pairs of adjacent ends;
   a strut interconnecting one pair of adjacent ends of said shoes;
   means for retaining said one pair of adjacent ends of said shoes in engagement with said strut;
   an anchor member carried by said backing plate about which the other pair of adjacent ends of said shoes pivot;

means for positioning said shoes with respect to said drum to establish a predetermined relationship between the drum and the respective shoes upon brake release;

said last named means including a bracket secured to the backing plate, said bracket having parallel spaced sides with opposed slots therein; and preloaded spring means operatively connecting said strut to said bracket, said strut freely sliding in said slots as said shoes are positioned under the influence of said preloaded spring means so that the biasing force acting to return said shoes to their brake release position remains constant.

2. The structure, as recited in claim 1, wherein said preloaded spring means includes a coil spring preloaded between said parallel sides.

3. The structure, as recited in claim 2, which further includes a collet frictionally engaging said strut and located at one end of said coil spring, and a washer located at the other end of said coil spring.

4. The structure, as recited in claim 3, wherein said collet, said washer and said coil spring are coaxially arranged on said strut between said parallel sides.

5. The structure, as recited in claim 4, wherein said strut is adjustably positioned in said collet.

6. The structure, as recited in claim 5, wherein the frictional force of engagement between said collet and strut resisting relative motion therebetween is of a predetermined value which is greater than the force of the preload on said coil spring.

* * * * *